US008680727B2

(12) United States Patent
Cors et al.

(10) Patent No.: US 8,680,727 B2
(45) Date of Patent: Mar. 25, 2014

(54) BRUSHLESS DIRECT CURRENT ACTUATOR WITH CLIP FOR RETAINING BOBBINS

(75) Inventors: Douglas Edward Cors, Elkhart, IN (US); Patrick B. Blakesley, Bristol, IN (US); Ryan P. Garver, Bristol, IN (US); Derek L. Crites, Niles, MI (US)

(73) Assignee: CTS Corporation, Elkhart, IN (US)

( * ) Notice: Subject to any disclaimer, the term of this patent is extended or adjusted under 35 U.S.C. 154(b) by 519 days.

(21) Appl. No.: 12/785,844

(22) Filed: May 24, 2010

(65) Prior Publication Data

US 2010/0301691 A1    Dec. 2, 2010

Related U.S. Application Data

(63) Continuation-in-part of application No. 12/584,161, filed on Sep. 1, 2009, now abandoned.

(60) Provisional application No. 61/217,100, filed on May 27, 2009, provisional application No. 61/269,834, filed on Jun. 30, 2009.

(51) Int. Cl.

| H02K 7/116 | (2006.01) |
|---|---|
| H02K 5/04 | (2006.01) |
| H02K 5/15 | (2006.01) |
| H02K 5/167 | (2006.01) |
| H02K 7/08 | (2006.01) |
| H02K 1/18 | (2006.01) |
| H02K 3/52 | (2006.01) |

(52) U.S. Cl.
CPC .............. *H02K 7/116* (2013.01); *H02K 1/185* (2013.01); *H02K 3/522* (2013.01); *H02K 5/15* (2013.01); *H02K 5/1677* (2013.01); *H02K 7/086* (2013.01)
USPC ................... 310/83; 310/43; 310/71; 310/89; 310/99

(58) Field of Classification Search
CPC ....... H02K 7/116; H02K 1/185; H02K 3/522; H02K 5/15; H02K 5/1677; H02K 7/086
USPC .................................. 310/43, 71, 83, 89, 99
IPC .............................................. H02K 7/116, 5/04
See application file for complete search history.

(56) References Cited

U.S. PATENT DOCUMENTS

| 2,412,254 | A | * | 12/1946 | Edelman | ...................... 310/75 R |
| 3,146,363 | A | * | 8/1964 | Sidell et al. | ..................... 310/83 |
| 3,248,867 | A | * | 5/1966 | Jepson et al. | ................... 368/76 |

(Continued)

FOREIGN PATENT DOCUMENTS

| DE | 199 52 450 | 7/2001 |
| DE | 101 01 609 | 7/2002 |

*Primary Examiner* — John K Kim
(74) *Attorney, Agent, or Firm* — Daniel J. Deneufbourg (57) ABSTRACT

A brushless rotary actuator comprises a housing including a motor housing defining a cavity for a motor assembly and a cover defining a cavity for a gear assembly. The motor assembly includes a rotor and a stator with a plurality of bobbins. A clip in the form of a ring plate is seated against the bobbins for retaining the bobbins on the stator. Fingers formed on the ring plate are fitted into respective slots defined by respective bobbin terminals. A circuit board is seated in the housing against an interior shoulder of the motor housing. A plate is seated in the housing against a peripheral rim of the motor housing in a spaced relationship above the circuit board.

5 Claims, 6 Drawing Sheets

(56) References Cited

U.S. PATENT DOCUMENTS

| | | | |
|---|---|---|---|
| 3,308,315 A * | 3/1967 | Mahon et al. | 310/41 |
| 3,599,022 A * | 8/1971 | Adair | 310/65 |
| 4,250,420 A * | 2/1981 | Grah et al. | 310/83 |
| 4,295,066 A | 10/1981 | Lloyd et al. | |
| 4,352,036 A * | 9/1982 | Kuwako | 310/83 |
| 4,410,818 A * | 10/1983 | Omata et al. | 310/41 |
| 4,553,056 A * | 11/1985 | Pfister | 310/80 |
| 4,893,038 A * | 1/1990 | Miyzawa | 310/83 |
| 5,043,613 A * | 8/1991 | Kurata et al. | 310/49.13 |
| 5,187,400 A * | 2/1993 | Kurata | 310/49.12 |
| 5,737,968 A * | 4/1998 | Hardey et al. | 74/421 A |
| 5,793,132 A * | 8/1998 | Hirose et al. | 310/71 |
| 5,828,151 A | 10/1998 | Bustamante et al. | |
| 5,842,680 A | 12/1998 | Bustamante et al. | |
| 5,880,551 A * | 3/1999 | Prudham | 310/261.1 |
| 5,901,801 A * | 5/1999 | Toida et al. | 180/65.1 |
| 6,509,661 B1 * | 1/2003 | Kujira et al. | 310/89 |
| 6,670,731 B2 * | 12/2003 | Kotani et al. | 310/49.24 |
| 7,116,210 B2 | 10/2006 | Lawrence et al. | |
| 7,304,450 B2 * | 12/2007 | Prudham | 318/721 |
| 7,466,092 B2 * | 12/2008 | Prudham | 318/400.01 |
| D587,661 S | 3/2009 | Blakesley | |
| 7,501,730 B2 * | 3/2009 | Kimura et al. | 310/71 |
| 7,501,929 B2 | 3/2009 | Lawrence et al. | |
| 2001/0048262 A1 * | 12/2001 | Takano et al. | 310/179 |
| 2002/0109421 A1 | 8/2002 | Horng | |
| 2004/0208017 A1 | 10/2004 | Takiguchi | |
| 2007/0022597 A1 * | 2/2007 | Shimura et al. | 29/596 |
| 2010/0060092 A1 | 3/2010 | Blakesley et al. | |
| 2010/0301691 A1 * | 12/2010 | Cors et al. | 310/83 |
| 2011/0203769 A1 * | 8/2011 | Cors | 165/67 |

* cited by examiner

BRUSHLESS DIRECT CURRENT ACTUATOR WITH CLIP FOR RETAINING BOBBINS

CROSS-REFERENCE TO RELATED AND CO-PENDING APPLICATIONS

This application is a continuation-in-part of, and claims the benefit of the filing date and disclosure of, U.S. application Ser. No. 12/584,161 filed on Sep. 1, 2009 and titled "Brushless Direct Current Actuator" now abandoned.

This application also claims the benefit of the filing dates and disclosures of U.S. Provisional Application Ser. No. 61/217,100 filed on May 27, 2009 and U.S. Provisional Application Ser. No. 61/269,834 filed on Jun. 30, 2009, all of which are explicitly incorporated herein by reference as are all references cited therein.

FIELD OF THE INVENTION

The present invention relates to actuators in general and, in particular, to a rotary brushless direct current actuator with a bobbin retaining clip.

BACKGROUND OF THE INVENTION

An example of a prior art actuator is shown in U.S. Pat. No. 5,880,551, titled, "Polyphase Motor Particularly for Driving an Indicator Needle" which discloses a polyphase motor comprised of a stationary member excited by electric coils and a magnetized rotor. The rotor has N pairs and, more specifically, four or five pairs, of poles magnetized radially in alternating directions. The stationary member has at least two W-shaped circuits, each including an electric coil surrounding the central strut. The W-shaped circuits are arranged so that, when one of the central struts is opposite a magnetic transition, the other central strut is roughly opposite a magnetic pole. Pole shoes associated with the central struts of the two W-shaped circuits can be spaced at 120 degree angles.

Electric motors are comprised of two main components, i.e., a rotor and a stator where the stator includes one or more bobbins mounted thereon which, due to tolerance stack-ups, are allowed to move on the stator. In certain applications, the bobbins include terminals which connect the bobbins to pins on a printed circuit board. As a result of vibration, however, movement of the bobbins can result in loss of contact between the bobbin terminals and the printed circuit board and thus loss of electrical contact. Overmolding of the bobbins to the stator has been used to secure the bobbins to the stator. This method, however, has proven rather expensive and can result in damage to the bobbin wires.

This invention is directed to a new actuator structure and a clip structure for capturing the bobbins on the stator of the actuator motor assembly.

SUMMARY OF THE INVENTION

The present invention is directed generally to an actuator assembly comprising a housing including first and second housing portions which define first and second cavities respectively; a motor assembly which is mounted in the first cavity in the first housing portion and includes a rotor shaft; a circuit board assembly which is located in the housing in a relationship overlying the motor assembly and in which the rotor shaft of the motor assembly extends through the circuit board assembly into the second cavity; a gear assembly which is located in the second cavity in the second housing portion in a relationship overlying the circuit board assembly and wherein at least a portion of the motor assembly is coupled to the rotor shaft; and an output shaft which extends into the second cavity defined by the second housing portion and is coupled to the gear assembly.

In one embodiment, the gear assembly comprises at least a first gear in the second cavity which is supported by a shaft in the second cavity and is coupled to the rotor shaft. A second gear is located in the second cavity and is stacked over the first gear. The output shaft is coupled to the second gear.

In one embodiment, the housing portion includes an interior peripheral shoulder and the circuit board assembly includes a peripheral edge. The peripheral edge of the circuit board assembly is seated against the interior shoulder of the first housing portion. The first housing portion also includes a peripheral exterior groove and the second housing portion defines a peripheral tongue which fits into the groove in the first housing portion. The circuit board assembly separates the first and second cavities. The first housing portion also defines a top peripheral rim and the actuator further comprises a plate in the housing which is seated against the top peripheral rim of the first housing portion in a relationship spaced above and parallel to the circuit board assembly.

The present invention is additionally directed to a plate or clip in the housing which restrains the movement of the bobbins of the stator assembly of the motor assembly. The clip includes a ring plate which is seated against the stator and the plurality of bobbins. In one embodiment, the ring plate is undulated and defines a plurality of curved regions overlying the plurality of bobbins respectively. The clip also includes a plurality of spaced-apart alignment fingers which extend outwardly from an exterior face of the ring plate and are adapted to be fitted in respective slots defined on the respective bobbins, and a plurality of first through-holes are defined in the plate and are adapted to receive respective screws for securing the ring plate to the stator. Each of the curved regions of the ring plate defines a boss seated on each of the plurality of bobbins respectively.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the following description of the accompanying FIGURES.

DETAILED DESCRIPTION OF THE EMBODIMENT

Figure 3:
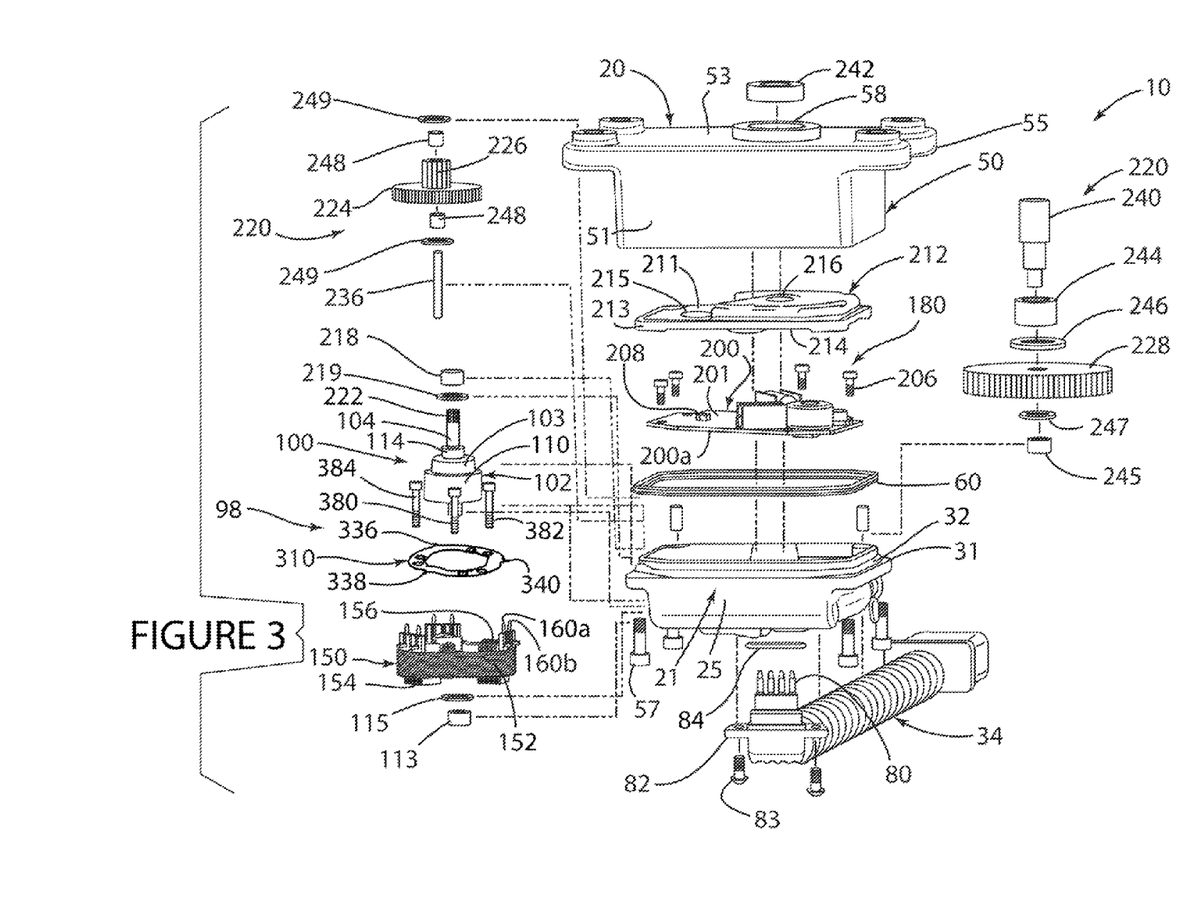
FIG. 3 is an exploded perspective view of the actuator of FIGS. 1 and 2.

FIGS. 1-4 depict an embodiment of a compact brushless direct current (BLDC) rotary actuator 10 in accordance with the present invention. Actuator 10 comprises a housing 20 (FIGS. 1, 2, and 3), a motor assembly 98 (FIG. 3), a sensor assembly 180 (FIG. 3), and a gear assembly 220 (FIG. 3). Actuator 10 can be used in a wide variety of applications including moving valves, switches, indicators and any other application where the precise control of rotary motion is required.

Figure 4:
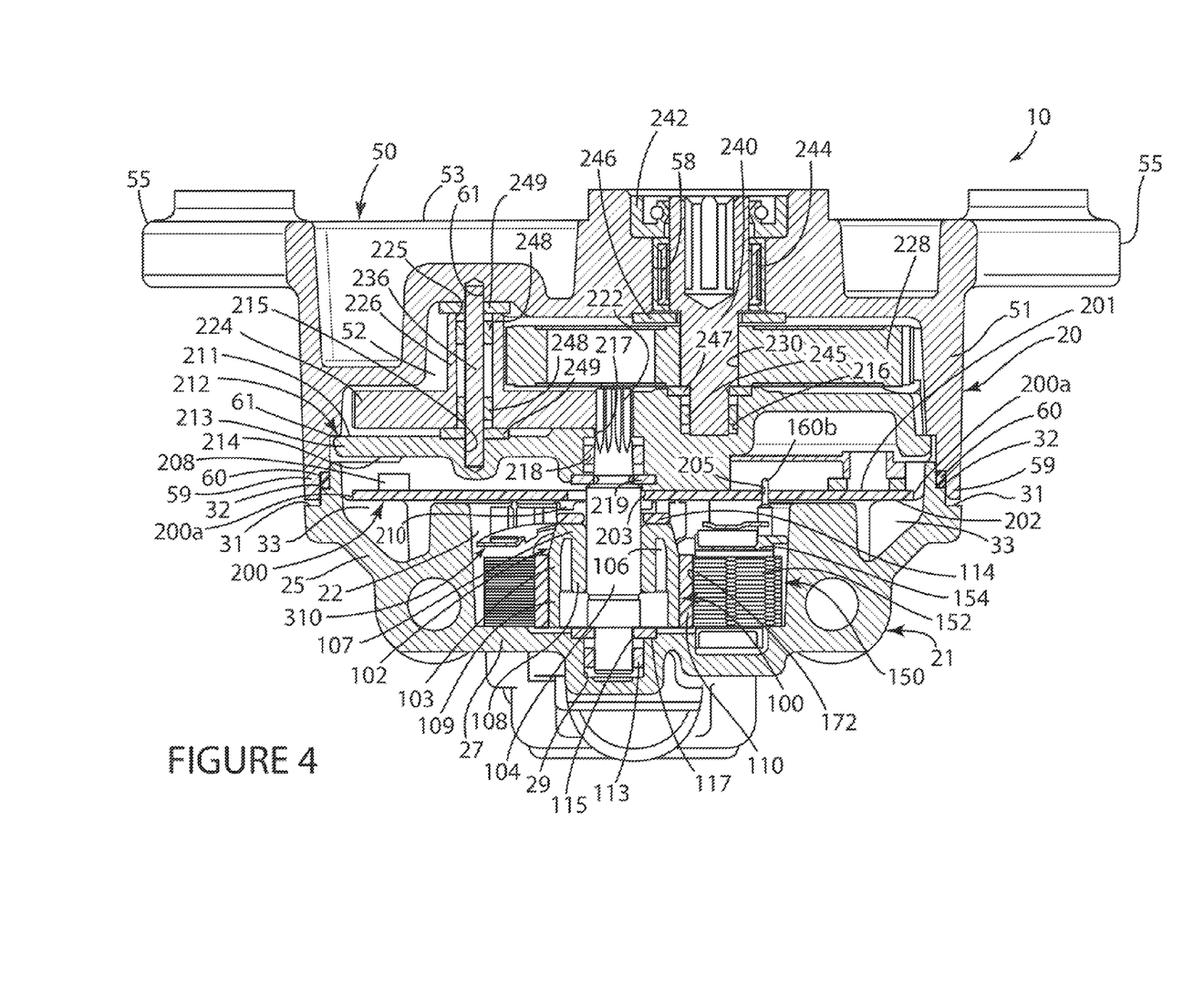
FIG. 4 is an enlarged vertical cross-sectional view of the actuator taken along the line 4-4 in FIG. 2.
Figure 5:
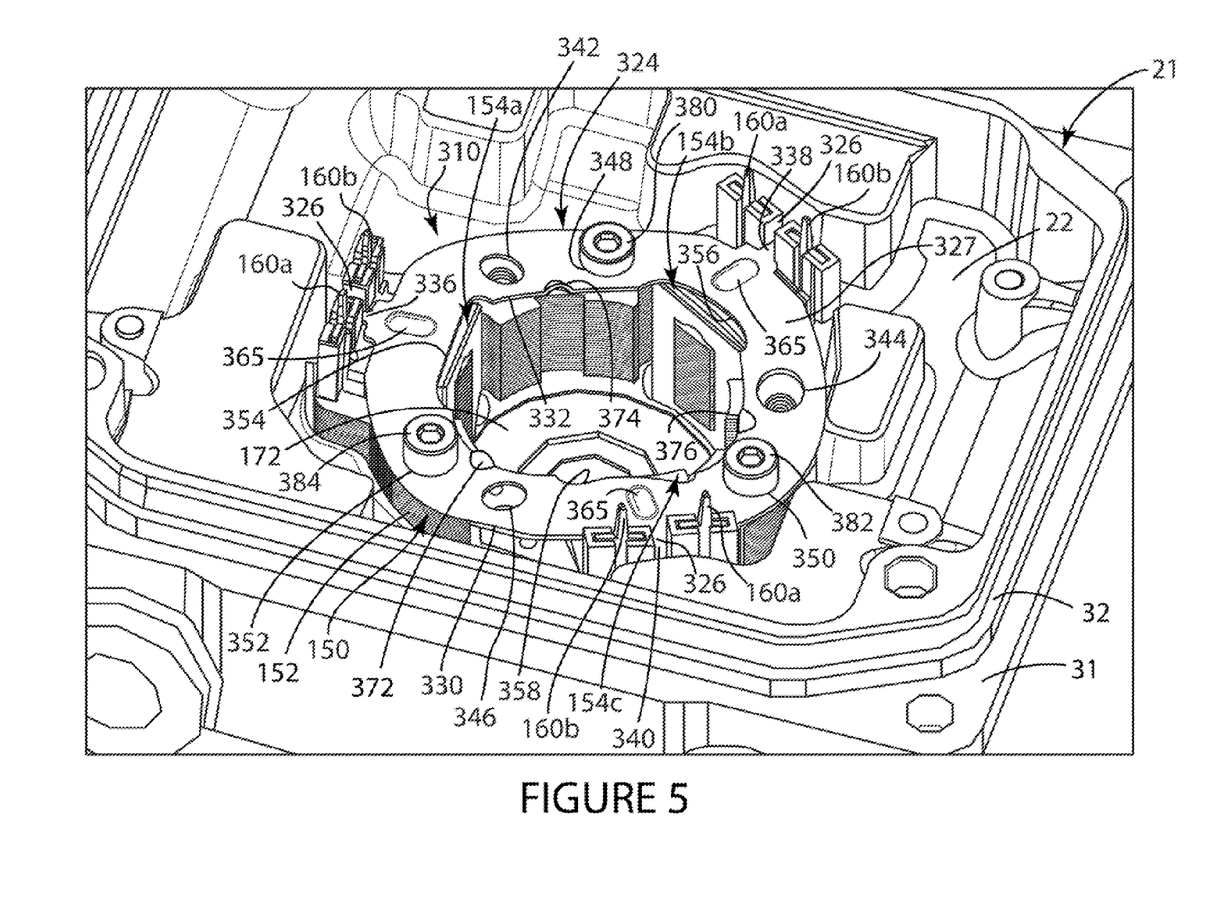
FIG. 5 is an enlarged top perspective view of a bobbin retainer in accordance with the present invention mounted over the stator and bobbins of the motor located in the housing of the actuator shown in FIGS. 1-4.

Housing 20 has two portions: a motor assembly housing portion 21 (FIGS. 1, 2, 3, 4, and 5) and a gear housing portion or cover 50 (FIGS. 1, 2, 3, and 4):

Motor housing portion 21 (FIGS. 3 and 4) includes a generally vertical peripheral side wall 25 (FIGS. 3 and 4) and a generally horizontal surface or wall 27 (FIG. 4) together defining a central interior cavity 22 (FIGS. 4 and 5). A cylindrical groove or recess 29 (FIG. 4) extends into the wall 27 from a central portion of the bottom of cavity 22.

A pair of peripheral, circumferentially extending offset grooves or shoulders 31 and 32 (FIGS. 3, 4, and 5) are formed on the top outside face of the distal peripheral rim of the side wall 25 of motor housing portion 21. A shoulder 33 (FIG. 4) is defined on the top inside face of the distal peripheral rim of the side wall 25 of motor housing portion 21.

Wire harness assembly 34 (FIG. 3) is coupled to motor assembly housing portion 21. Wire harness assembly 34 includes a plurality of generally L-shaped, elongated metal connector terminals 80 (FIG. 3) which extend outwardly from a harness bracket 82 (FIG. 3) through an aperture 81 (FIG. 1) defined and extending into the wall 27 of motor housing portion 21 into the interior cavity 22 thereof. Bracket 82 is adapted to be secured to the motor housing portion 21 via respective connector screws 83. A seal ring 84 (FIG. 3) is disposed between bracket 82 and the outside surface of the wall 27 of housing portion 21. Wire harness assembly 34 provides power, ground and control signals to the actuator 10.

Gear housing portion or cover 50 (FIGS. 1-4) includes a circumferential vertical side wall 51 (FIGS. 1-4) and a top horizontal wall 53 (FIGS. 2-4) together defining a central interior gear cavity 52 (FIG. 4). A groove or recess 61 (FIG. 4) extends from the bottom of cavity 52 inwardly into the interior surface of top horizontal wall 53. Top horizontal wall 53 additionally defines a cylindrical through-hole 58 (FIGS. 2 and 4) extending between the exterior and interior surfaces thereof and into communication with the interior gear housing cavity 52.

Figures 1, 2:
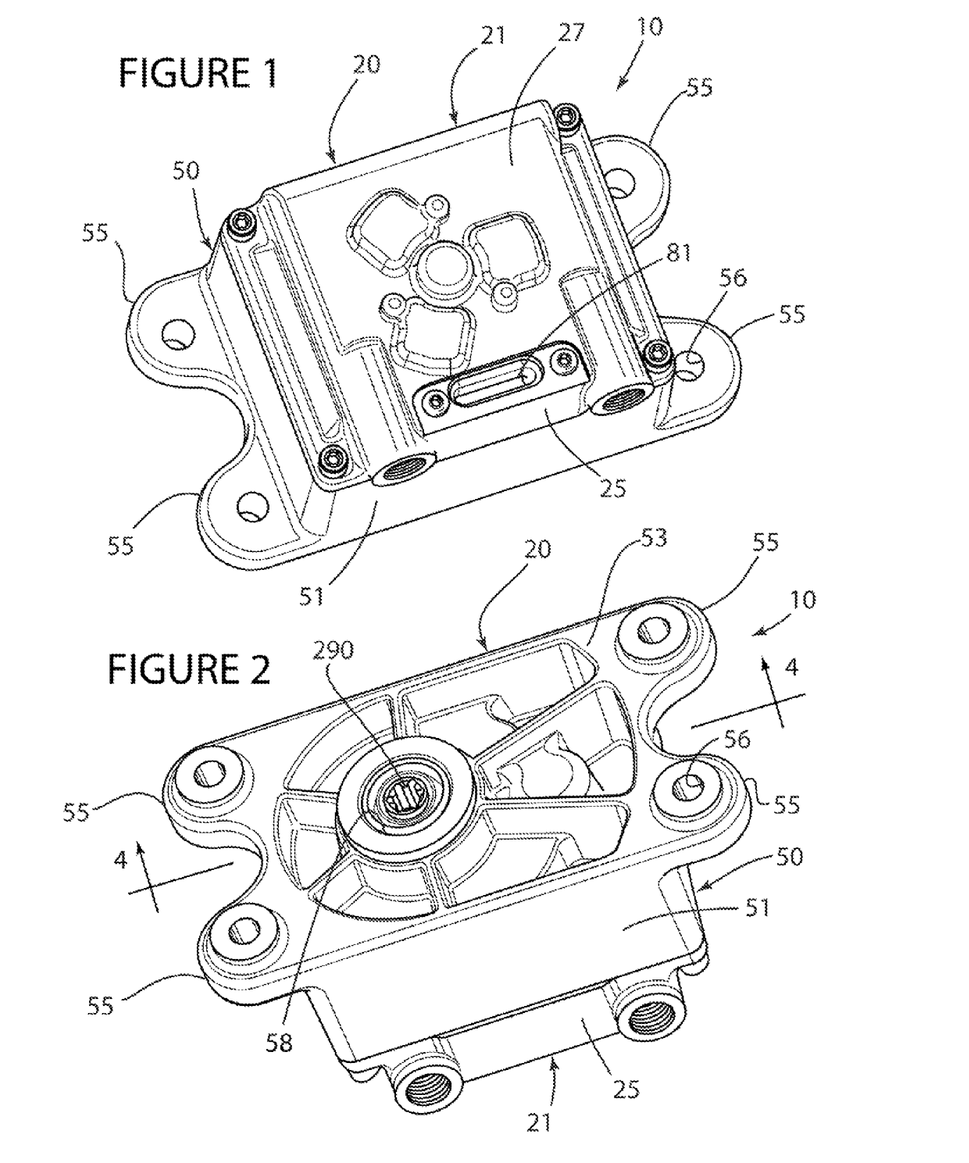
FIG. 1 is a top perspective view of an actuator in accordance with the present invention.
FIG. 2 is a bottom perspective view of the actuator of FIG. 1.

In the embodiment shown, a mounting arm or bracket 55 (FIGS. 1-4) extends outwardly from each of the corners of the cover 50 and, more specifically, the corners of the wall 27 thereof, and defines a central through aperture 56 (FIGS. 1 and 2). A fastener, such as a screw or bolt 57 (FIG. 3), extends through each of the bracket apertures 56 and is threaded into mating threads (not shown) on an object to which brushless direct current rotary actuator 10 is attached such as, for example, a frame, a chassis, a bracket, an engine, or a manifold.

Vertical side surface 51 of cover 50 additionally includes a peripheral circumferential distal rim including a distal tongue 59 (FIG. 4) which is fitted in and abuts against the shoulder 31 of motor housing portion 21 when motor housing portion 21 and cover 50 are coupled together. A seal ring 60 (FIGS. 3 and 4) is seated on the shoulder 32 of motor housing portion 21 and provides a seal between housing portion 21 and cover 50 and, more specifically, between the outside face of side wall 25 of motor housing portion 21 and the interior face of the side wall 51 of cover 50.

Actuator 10 further comprises a motor assembly 98 (FIG. 3) which generally includes a rotor assembly 100 (FIGS. 3 and 4) and a stator assembly 150 (FIGS. 3, 4, and 5).

Rotor assembly 100 is located and mounted in the cavity 22 of motor housing 21 and includes a yoke 102 (FIGS. 3 and 4) having a circular skirt portion 103 (FIGS. 3-4) and a cylindrical central pinion or post or shaft 104 (FIGS. 3 and 4). Skirt portion 103 is defined by respective generally vertical circumferential interior spaced-apart and parallel walls 108 and 109 (FIG. 4) and a generally horizontal top radial circumferential wall or shoulder 107 (FIG. 4) which is unitary with the top of the walls 108 and 109. Walls 108 and 109 together define an interior circumferential slot 106 (FIG. 4).

A motor gear 222 (FIGS. 3 and 4) is formed on the exterior surface of the top end of rotor shaft 104. The bottom end of shaft 104 is seated in groove 29 defined in the bottom of motor housing 21. A bearing 113 (FIGS. 3 and 4) is press-fit into the groove 29 and supports the end of shaft 104 for rotation relative to the motor housing 21. A thrust washer 115 (FIGS. 3 and 4) surrounds the bottom end of shaft 104 and is seated against an interior shoulder 117 (FIG. 4) in motor housing wall 27 and surrounding the groove 29 to support and maintain rotor shaft 104 and thus rotor assembly 100 vertically in the cavity 22 of motor housing 21. A cylindrically-shaped motor magnet 110 (FIGS. 3 and 4) extends around a lower peripheral outside edge of the skirt wall 109 and is magnetized in sections of alternating polarity north and south. A generally doughnut-shaped sensor magnet 114 (FIGS. 3 and 4) is seated on the top exterior face of the skirt wall 107 and is magnetized in sections of alternating polarity north and south. The magnets 110 and 114 may be formed from Neodymium Iron Boron and magnetized using an appropriate magnetizer.

Stator assembly 150 (FIGS. 3 and 4) is also mounted in cavity 22 of lower motor housing portion 21 in a relationship surrounding and spaced from the rotor assembly 100. Stator assembly 150 includes several steel laminations 152 (FIGS. 3 and 4), bobbins 154 (FIGS. 3 and 4), and windings 156 (FIGS. 3, 4, and 5) and defines a central aperture 172 (FIGS. 4 and 5). Laminations 152 are generally circular in shape. A plurality of laminations can be stacked to form the stator assembly 150. Rotor assembly 100 extends through the central stator aperture 172. Copper wire winding 156 is wound on each of the plastic bobbins 154. Each wire winding 156 defines ends that are electrically connected to stator terminals 160a and 160b (FIGS. 3 and 5).

Further details on the construction and operation of rotor and stator assemblies of the type disclosed in this application are disclosed in one or more of the following U.S. patents and patent publications, the description of which is incorporated herein by reference:

U.S. Pat. No. 5,880,551 entitled "Polyphase Motor Particularly for Driving an Indicator Needle"; U.S. Pat. No. 7,304,450 entitled "Motor-Reduction Unit Switched on an Absolute Position Signal"; and U.S. Pat. No. 7,466,092 entitled "Polyphase Motor", the entire contents of which are herein incorporated by reference.

A bobbin retainer clip 310 (FIGS. 3, 4, and 5-10) retains the bobbins 154 on stator assembly 150 and is described in more detail below.

FIG. 5 depicts one embodiment of the bobbin retainer or clip 310 in accordance with the present invention secured to the top of the stator assembly 150 mounted in the cavity 22 of motor housing portion 21.

Stator assembly 150, which in the embodiment shown is generally ring-shaped, includes three bobbins 154a, 154b, and 154c secured thereto. Although not shown in any of the FIGURES, it is understood that the stator assembly 150 defines respective fingers (not shown) and that each of the bobbins 154a, 154b, and 154c defines a central aperture which allows the respective bobbins 154a, 154b, and 154c to be slid onto each of the respective stator fingers in a manner similar to the way in which a ring is slid and fitted on one's finger.

Each of the bobbins 154a, 154b, and 154c includes a pair of spaced-apart and parallel terminals 160a and 160b (FIGS. 3, 4, and 5) which extend generally vertically upwardly and outwardly from the top surface of each of the respective bobbins 154a, 154b, and 154c. Each of the bobbins 154a, 154b, and 154c defines an elongated vertical slot 326 (FIG. 5) between the respective terminals 160a and 160b thereof.

The terminals 160a and 160b of each of the bobbins 154a, 154b, and 154c are adapted for coupling to a printed circuit board 200 (FIG. 4) which is situated and mounted over the stator assembly 150 and, more specifically, are adapted to make electrical contact with sockets (not shown) on the printed circuit board 200 (FIGS. 3 and 4).

Inasmuch as the terminals 160a and 160b must remain in continuous electrical contact with the printed circuit board 200, it is imperative that there be minimal movement of the bobbins 154a, 154b, and 154c. However, because the bobbins 154a, 154b, and 154c are elements separate from the stator assembly 150, the bobbins 154a, 154b, and 254c will, unless restrained, move relative to the stator assembly 150 in response to, for example, vibration of the housing 20. The bobbin retainer 310 of the present invention minimizes such movement and resultant loss of electrical contact as described in more detail below.

Bobbin retainer or clip 310 includes a ring-shaped plate 324 (FIGS. 5-10) formed from a flat sheet or strip of metal or the like rigid material which includes opposed upper and lower surfaces 327 and 328 (FIGS. 5-10), an outside generally vertical peripheral circumferentially extending surface or face 330 (FIGS. 5-9) and an interior generally vertical peripheral circumferentially extending ring interior surface or face 332 (FIGS. 5-10).

Retainer 310 and, more specifically, the ring plate 324 thereof includes three retainer alignment fingers 336, 338, and 340 (FIGS. 3, 5, 6, 7, 8, and 9) protruding outwardly from the outside ring face 330 in a relationship generally normal to the ring face 330 and generally co-planar with the surfaces 327 and 328. In the embodiment shown, fingers 336, 338, and 340 are spaced from each other and extend around the periphery of the ring plate 324 at 120 degree intervals.

Ring plate 324 further defines a first set of generally circular apertures or through-holes 342, 344, and 346 (FIGS. 5, 6, and 7) and a second set of generally circular apertures or through-holes 348, 350, and 352 (FIGS. 5, 6, and 7) extending and protruding through the surfaces 327 and 328 of the ring plate 324.

The first set of through-holes 342, 344, and 346 define stator alignment through-holes as described in more detail below. The second set of through-holes 348, 350, and 352 define retainer mounting through-holes as described in more detail below.

Through-holes 342 and 348 are located on the ring plate 324 generally centrally between the fingers 336 and 338 in a spaced-apart and co-linear relationship wherein the through-hole 342 is adjacent the finger 336 and the through-hole 348 is adjacent the finger 338; the through-holes 344 and 350 are located on the ring plate 324 generally centrally between the fingers 338 and 340 in a spaced-apart and co-linear relationship wherein the through-hole 344 is adjacent finger 338 and the through-hole 350 is adjacent the finger 340; and the through-holes 346 and 352 are located on the ring plate 324 generally centrally between the fingers 340 and 336 in a spaced-apart and co-linear relationship wherein the through-hole 346 is adjacent the finger 340 and the through-hole 352 is adjacent the finger 336.

In the embodiment shown, the through-holes 342, 344, and 346 all have the same diameter and the through-holes 348, 350, and 352 all have the same diameter where the diameter of the through-holes 342, 344, and 346 is slightly larger than the diameter of the through-holes 348, 350, and 352. In one embodiment, each of the through-holes 348, 350, and 352 may be slightly stretched or elongated.

The retainer 310 and, more specifically, the ring plate 324 thereof additionally includes three elongated cut-outs 354, 356, and 358 (FIGS. 5, 6, and 7) formed and extending into the interior ring face 332 in the region thereof opposite the respective fingers 336, 338, and 340 respectively.

As shown in FIGS. 2 and 4, the retainer 310 and, more specifically, the ring plate 324 thereof, is bent and shaped during the manufacturing process in a manner wherein the ring plate 324 defines a first set of curvilinear regions 360, 362, and 364 (FIGS. 6 and 7) and a second set of curvilinear regions 366, 368, and 370 (FIGS. 6 and 7) which curve in an orientation opposite the curve of regions 360, 362, and 364. The first set of curved regions 360, 362, and 364 are defined in the region of the ring plate 324 which includes the fingers 336, 338, and 340 respectively. The second set of curved regions 366, 368, and 370 are defined in the region of the ring plate 324 generally between the through-holes 342 and 348; 344 and 350; and 346 and 352 respectively.

Figure 6:
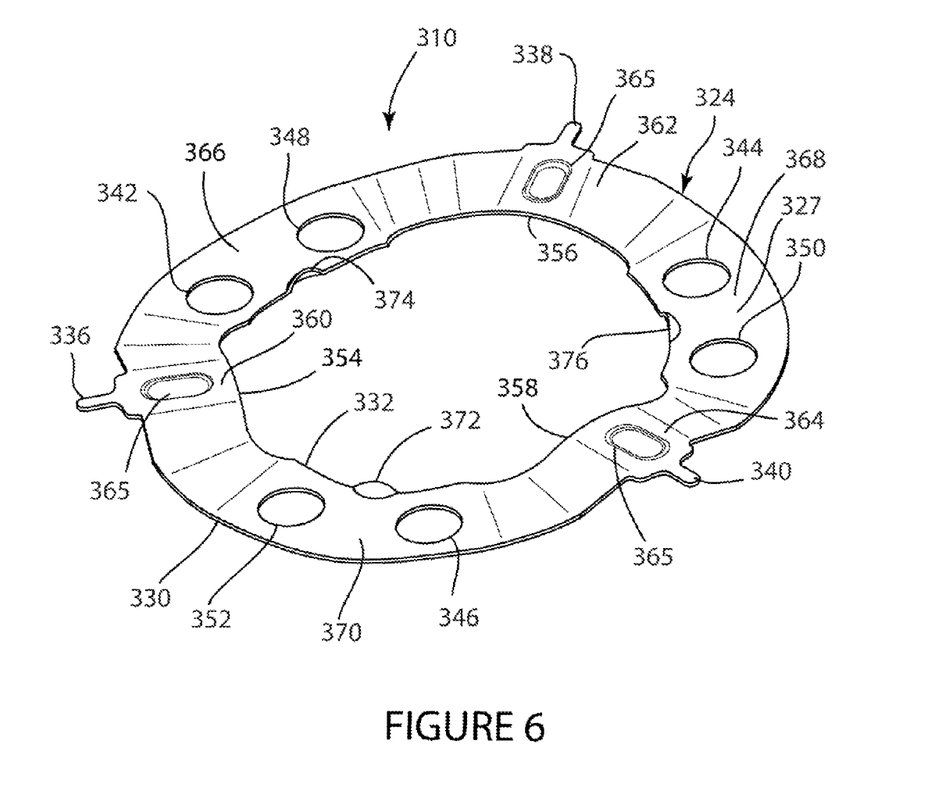
FIG. 6 is an enlarged perspective view of the bobbin retainer of the present invention.
Figure 7:
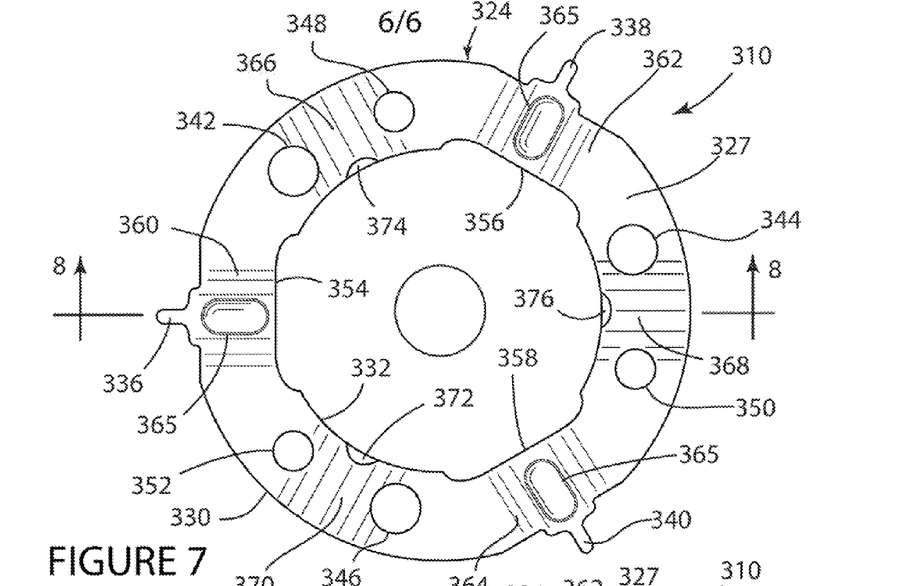
FIG. 7 is an enlarged top plan view of the bobbin retainer shown in FIG. 6.
Figure 8:
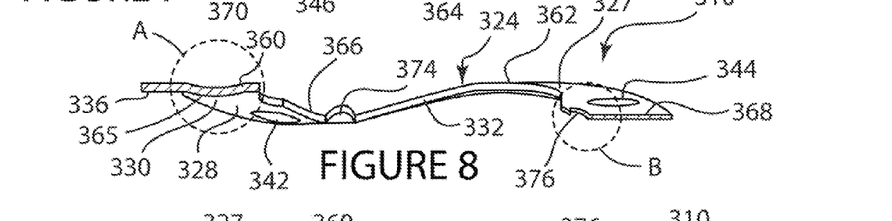
FIG. 8 is an enlarged vertical cross-sectional view of the bobbin retainer taken along the line 8-8 in FIG. 7.

In the orientation of FIGS. 6, 7, and 8 where the surface 327 of the ring plate 324 is the top surface of the ring plate 324, the curved regions 360, 362, and 364 define respective convexly-shaped regions and the curved regions 366, 368, and 370 define respective concavely-shaped regions which together form a ring plate 324 with a continuous undulated curvilinear up-and-down pattern.

Figure 9:
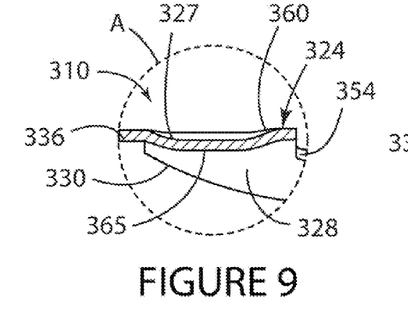
FIG. 9 is an enlarged broken side elevational view of the region A of the bobbin retainer shown in FIG. 8.
Figure 10:
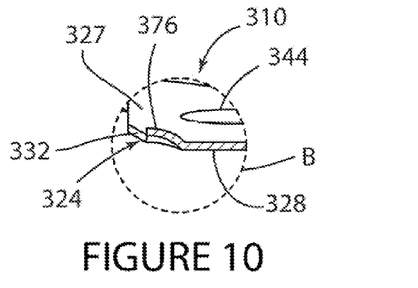
FIG. 10 is an enlarged broken side elevational view of the region B of the bobbin retainer shown in FIG. 8.

As shown in FIGS. 8 and 9, each of the curved regions 360, 362, and 364 additionally defines a depression or trough or boss 365 (FIGS. 5, 6, 7, and 8) extending transversely between the outside and interior faces 330 and 332 of the ring plate 324 in an orientation generally normal to the curve in the regions 360, 362, and 364 respectively.

As also shown in FIGS. 8 and 9, the ring plate 324 additionally includes a plurality of ears or bumps 372, 374, and 376 (FIGS. 5, 6, 7, and 8) formed on, and protruding outwardly from, the ring surface 327 adjacent the interior ring vertical face 332. The bump 372 is formed on the surface 327 between the through-holes 346 and 352 and thus between the fingers 336 and 340; the bump 374 is formed on the surface 327 between the through-holes 342 and 348 and thus between the fingers 336 and 338; and the bump 376 is formed on the surface 327 between the through-holes 344 and 350 and thus between the fingers 338 and 340.

In accordance with the present invention as shown in FIG. 5, the retainer 310 is seated over the top of the stator assembly 150 in a relationship wherein the surface 328 of the ring plate 324 is seated against the top of the stator assembly 150; respective retainer fingers 336, 338, and 340 thereof are aligned with and seated in the slots 336 of the respective terminals 160a and 160b of the respective bobbins 154a, 154b, and 154c; the respective curved ring portions 360, 362, and 364 overlie the top of the respective bobbins 154a, 154b, and 154c; the respective bosses 365 are seated against the top of the respective bobbins 154a, 154b, and 154c; and the respective mounting through-holes 348, 350, and 352 are in alignment with the respective through-holes (not shown) in the stator 150.

Although not shown, it is understood that the respective stator alignment through-holes 342, 344, and 346 formed in the ring plate 324 define access or entry openings for stator alignment pins (not shown) adapted to be inserted therethrough during the assembly process for allowing the alignment of the stator 150 as known in the art. Once the stator assembly 150 in housing 20 has been properly aligned, respective stator mounting screws 380, 382, and 384 (FIGS. 3 and 5) are inserted through the respective mounting through-holes 348, 350, and 352 in the ring plate 324 and the respective through-holes (not shown) in the stator assembly 150 to secure the stator assembly 150 to the housing 20 and the retainer 310 against the top of the stator assembly 150.

More specifically, when the mounting screws 380, 382, and 384 are tightened, the ring plate 324 and, more specifically, each of the curved portions 360, 362, and 364 thereof, exert a compressive spring force against the top of the respective bobbins 154a, 154b, and 154c to secure, capture, and minimize relative movement between the bobbins 154a, 154b, and 154c and the stator 150 and thus prevent any loss of contact between any of the bobbin terminals 160a and 160b and the respective contact sockets (not shown) in the printed circuit board 200 through which the terminals 160a and 160b extend.

In accordance with the present invention, the boss or depression 365 formed in the respective curved regions 360, 362, and 364 defines a flat surface seated against the top of the bobbins 154a, 154b, and 154c respectively which prevents any sharp edges or burrs on the ring plate 324 from damaging the insulation of the wire wrapped around each of the respective bobbins 154a, 154b, and 154c. The cut-outs 354, 356, and 358 in the ring plate 324 provide clearance between the front frame of the respective bobbins 154a, 154b, and 154c and the interior face 332 of the ring plate 324. The ears 372, 374, and 376 are anti-nesting features which make it easier to separate the individual plates 324 during the manufacturing process and assure that only one retainer 310 is installed per assembly.

Sensor assembly 180 (FIG. 3) comprises rotor sensor magnet 114 (FIGS. 3 and 4) and at least one Hall effect sensor 210 (FIG. 4) which has been mounted to, and hangs downwardly from, the lower side of the generally flat printed circuit board 200 (FIGS. 3 and 4) which is mounted in housing 20.

Printed circuit board 200 defines a peripheral circumferential edge 200A (FIGS. 3 and 4) which follows the contour of, and is seated on, the interior shoulder 33 of the wall 25 of motor housing portion 21. Circuit board 200 covers and overlies motor housing cavity 22 and thus rotor and stator assemblies 100 and 150 seated in cavity 22. Circuit board 200 has a top side or surface 201 (FIGS. 3 and 4); a bottom side or surface 202 (FIG. 4); defines a central aperture 203 (FIG. 4); and a plurality of plated through-holes 205 (FIG. 4). In the embodiment shown, the upper end of the shaft 104 of rotor 100 including the gear 222 extends through the central board aperture 203 and into the cavity 52 defined by cover 50.

A plurality of electronic components including a processor or controller (not shown) and other passive and active electronic components 208 (FIGS. 3 and 4) are mounted on the top side 201 of the circuit board 200. Hall effect sensor 210 is mounted to the bottom side 202 of the circuit board 200. Hall effect sensor 210 senses the magnetic field generated by the rotor sensor magnet 114. Stator terminals 160a and 160b (FIGS. 3 and 4) extend outwardly and upwardly from stator assembly 150; are inserted into selected ones of the plated through-holes 205 in the board 200 which overlies the stator assembly 150; and are held in place as by interference fitting, soldering, or the like.

Although not shown in any of the FIGURES, it is understood that connector terminals 80 in motor housing 21 (FIG. 3) are likewise also inserted into selected ones of plated through-holes 205 in board 200 and held in place as by interference fitting, soldering, or the like.

As further shown in FIG. 3, a plurality of screws 206 extend through respective apertures in the board 200 and the housing 21 for securing the board 200 to the interior shoulder 33 of the wall 25 of the motor housing portion 21.

As shown in FIGS. 3 and 4, actuator 10 further comprises an intermediate plate 212 also located in housing 20 which includes a peripheral circumferential edge 213 seated against the top rim of the wall 25 of motor housing 21 in a relationship overlying, spaced from, and parallel to the circuit board 200. The plate 212 includes a top surface 211 and a bottom surface 214. Top surface 213 defines at least first and second recesses or grooves 215 and 216 and a central through aperture 217. The end of rotor shaft 104 which forms the gear 222 extends through the aperture 217 and into the gear housing cavity 52.

A bearing 218 is press-fit into the aperture 217 and supports the rotor shaft 104 for rotation relative to the plate 212. A thrust washer 219 surrounds the end of rotor shaft 104 with the gear 222 and is seated against a shoulder formed in the bottom surface 214 of plate 212 to support and maintain the requisite vertical orientation and support of rotor assembly 100 in housing 20 relative to the housing portion 21 and the plate 212.

Gear assembly 220 (FIGS. 3 and 4) is located above the plate 212 in the cavity 52 of the cover 50. Gear assembly 220 includes the gear 222 which surrounds the distal top end of rotor shaft 104 and the following stacked gears: intermediate full gear 224, full pinion gear 226, and full output gear 228 (FIGS. 3 and 4). Gears 222, 224, 226 and 228 can be formed from plastic. In the embodiment shown, at least a portion of gear assembly 220 overlies motor assembly 98.

As earlier described, the gear 222 is formed on the distal top end of the rotor shaft 104. Gear 222 is coupled to and drives intermediate gear 224 which is positioned adjacent and generally co-planar with motor gear 222 and overlies at least a portion of the motor assembly 98. The pinion gear 226 is located generally centrally above and coupled to the intermediate gear 224. The pinion gear 226 drives the output gear 228 which is positioned adjacent and generally co-planar with the pinion gear 226; is stacked above the intermediate gear 224; and overlies at least a portion of the motor assembly 98. The intermediate gear 224 and the pinion gear 226 together define a central interior through-hole 225 (FIG. 4).

A metal intermediate gear shaft 236 (FIGS. 3 and 4) extends through respective apertures defined in the gears 224 and 226. A top end of the shaft 236 is press-fit into the recess 61 defined in the interior surface of cover 50 and a bottom end of shaft 236 is press-fit into the recess 215 defined in the plate 212. A pair of bearings 248 (FIGS. 3 and 4) which are press-fit into aperture 225 and a pair of thrust washers 249, one of which is sandwiched between the plate 212 and bottom surface of gear 224 and the other of which is sandwiched between the interior surface of the cover 50 and the top surface of pinion gear 226, support the shaft 236 and thus the gears 224 and 226 for rotation relative to plate 212 and the cover 50. In the embodiment shown, intermediate gear shaft 236 is spaced from and parallel to the rotor shaft 104.

Output gear 228 (FIGS. 3 and 4) defines a central, cylindrical through-hole or opening 230 (FIG. 4) that accepts a central portion of an output shaft 240 (FIGS. 3 and 4).

A top end of the output shaft 240 protrudes through the cylindrical through-hole 58 formed in the cover 50 and defines a top splined female groove or recess adapted to receive the male end of the shaft (not shown) of the valve, switch, indicator or the like device to which actuator 10 is coupled. A bottom end of the output shaft 240 extends into the recess 216 defined in the plate 212. A first output shaft bearing 244 (FIGS. 3 and 4) is press-fit into the through-hole 58 of the cover 50 and a second output shaft bearing 245 (FIGS. 3 and 4) is press-fit into the recess 216 in the plate 212 (FIGS. 3 and 4) for supporting the output shaft 240 and the gear 228 for rotary movement relative to the cover 50 and the plate 212. A pair of thrust washers 246 and 247 also support the shaft 240 and the gear 228 relative to the cover 50 and plate 212. The washer 246 is sandwiched between the top surface of the gear 228 and the interior surface of the cover 50, while the washer 247 is sandwiched between the bottom surface of the gear 228 and the plate 212.

A rubber output seal 242 (FIGS. 3 and 4) seals the region between the output shaft 240 and the interior cylindrical wall of the cover 50 which defines the through-hole 58. The top end of the output shaft 240 which protrudes out of the through-hole 58 can be coupled to an object that is desired to be accurately or precisely moved such as, for example, a valve. In the embodiment of the actuator 10 shown in FIGS. 1-4, the output shaft 240 overlies the motor assembly 98, the circuit board 200, and the plate 212 in a relationship spaced from and parallel to both the rotor shaft 104 and the intermediate gear shaft 236.

During operation, Hall effect sensor 210 senses the magnetic field generated by the sensor magnet 114 (FIGS. 3 and 4) and provides a signal representative of the position of rotor assembly 100 to the processor (not shown). The processor regulates, commutates, or switches the direction of current passing through the wire windings 156 such that each column associated therewith is switched at the right time to become a north or south electro-magnet thereby attracting or repelling the motor magnet 100 causing the rotor assembly 100 to rotate. The rotation of the rotor assembly 100 drives the motor gear 222 which drives the intermediate gear 224 and pinion gear 226 which drives output gear 228 and the output shaft 240. The processor can thereby accurately determine and control the rotary position of the output shaft 240.

While the invention has been taught with specific reference to the embodiment described above, someone skilled in the art will recognize that changes can be made in form and detail without departing from the spirit and the scope of the invention. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An actuator comprising:
   a housing defining a cavity;
   a motor mounted in the cavity in the housing, the motor including a rotor and a stator including at least one bobbin, the bobbin includes a pair of terminals defining a slot therebetween;
   a plate in the cavity in the housing and seated against and over the top of the bobbin, the plate including a retainer alignment finger fitted in the slot in the bobbin;
   at least one stator mounting screw that secures the stator to the housing, the plate including at least one through-hole defined therein which receives the stator mounting screw for securing the plate to the stator;
   a gear assembly located in the cavity in the housing and coupled to the rotor; and
   an output shaft extending into the cavity in the housing and coupled to the gear assembly.

2. An actuator comprising:
   a housing defining a cavity;
   a motor mounted in the cavity in the housing, the motor including a rotor including a rotor shaft and a plurality of bobbins are retained on a stator, each including a pair of terminals defining a slot therebetween;
   a plate in the cavity in the housing and seated against and over the plurality of bobbins and secured to the stator for retaining the plurality of bobbins on stator,
   the plate being in the form of a ring seated against the plurality of bobbins, the ring including three spaced-apart fingers fitted in the slots in the plurality of bobbins respectively, the ring further defining at least one stator alignment through-hole defining an access opening for a stator alignment pin;
   at least one stator mounting screw that secures the stator to the housing, the plate including at least one through-hole defined therein which receives the stator mounting screw for securing the plate to the stator;
   a gear assembly located in the cavity in the housing and coupled to the rotor shaft; and
   an output shaft extending into the cavity in the housing and coupled to the gear assembly.

3. The actuator of claim 2 wherein the ring includes an undulating curvilinear pattern.

4. An actuator comprising:
   a housing defining a cavity;
   a motor mounted in the cavity in the housing, the motor including a rotor and a stator including at least one bobbin;
   a plate in the cavity in the housing and seated against and over the top of the bobbin, the plate including at least one convexly-shaped region defining a plate with an undulated up-and-down pattern;
   at least one stator mounting screw that secures the stator to the housing, the plate including at least one through-hole defined therein which receives the stator mounting screw for securing the plate to the stator, the at least one convexly-shaped region of the plate exerting a compressive spring force against the top of the bobbin when the mounting screw is tightened;
   a gear assembly located in the cavity in the housing and coupled to the rotor; and
   an output shaft extending into the cavity in the housing and coupled to the gear assembly.

5. An actuator comprising:
   a housing defining a cavity;
   a motor mounted in the cavity in the housing, the motor including a rotor and a stator including a plurality of bobbins with respective terminals defining respective slots;
   a plate in the form of a ring seated against and over the to of the plurality of bobbins, the terminals of the bobbins surrounding an outside face of the plate, and the plate including an undulated curvilinear pattern and a plurality of spaced-apart fingers extending outwardly from the outside face of the plate and adapted to be fitted in the respective slots of the respective terminals of the respective bobbins;

at least one stator mounting screw that secures the stator to the housing, the plate including at least one through-hole defined therein which receives the stator mounting screw for securing the plate to the stator;

a gear assembly located in the cavity in the housing and coupled to the rotor; and an output shaft extending into the cavity in the housing and coupled to the gear assembly.

* * * * *